United States Patent
Chiang et al.

(10) Patent No.: US 11,057,782 B2
(45) Date of Patent: Jul. 6, 2021

(54) MULTI-CELL COORDINATION SYSTEM AND CHANNEL CALIBRATION METHOD THEREOF

(71) Applicant: Sercomm Corporation, Taipei (TW)

(72) Inventors: Kun-Lin Chiang, Taipei (TW); Jia-Ming Chen, Taipei (TW)

(73) Assignee: Sercomm Corporation, Taipei (TW)

( * ) Notice: Subject to any disclaimer, the term of this patent is extended or adjusted under 35 U.S.C. 154(b) by 295 days.

(21) Appl. No.: 16/224,737

(22) Filed: Dec. 18, 2018

(65) Prior Publication Data

US 2020/0196160 A1 Jun. 18, 2020

(51) Int. Cl.
  *H04W 16/28* (2009.01)
  *H04B 7/0456* (2017.01)
  *H04L 5/00* (2006.01)
  *H04W 72/04* (2009.01)
  *H04B 17/12* (2015.01)

(52) U.S. Cl.
  CPC .......... *H04W 16/28* (2013.01); *H04B 7/0456* (2013.01); *H04B 17/12* (2015.01); *H04L 5/0048* (2013.01); *H04W 72/046* (2013.01); *H04W 72/0453* (2013.01)

(58) Field of Classification Search
None
See application file for complete search history.

(56) References Cited

U.S. PATENT DOCUMENTS

| 8,848,673 B2 | 9/2014 | Dinan | |
|---|---|---|---|
| 2012/0157140 A1* | 6/2012 | Kim | H04B 7/024 455/501 |

(Continued)

FOREIGN PATENT DOCUMENTS

| CN | 102340338 | 2/2012 |
|---|---|---|
| CN | 102511130 | 6/2012 |

(Continued)

OTHER PUBLICATIONS

"Office Action of Taiwan Counterpart Application", dated Jun. 5, 2019, p. 1-p. 4.

(Continued)

*Primary Examiner* — Steve R Young
(74) *Attorney, Agent, or Firm* — JCIPRNET

(57) ABSTRACT

A multi-cell coordination system and a channel calibration method thereof are provided. A reference apparatus receives a beam-precoding downlink reference signal via a directional beam from a base station. The base station receives a beam-precoding uplink reference signal via the directional beam from the reference apparatus. The server receives uplink and downlink channel information, where the uplink channel information is generated based on the uplink reference signal, and the downlink channel information is generated based on the downlink reference signal. The server obtains a channel calibration coefficient according to the uplink and downlink channel information. The channel calibration coefficient is used for estimating a downlink channel. Accordingly, the problem of conventional coordination system can be solved, and the embodiment can be implemented in multi-beam base station.

8 Claims, 4 Drawing Sheets

(56) References Cited

U.S. PATENT DOCUMENTS

| | | | |
|---|---|---|---|
| 2016/0094318 A1 | 3/2016 | Shattil | |
| 2018/0262242 A1* | 9/2018 | Chakraborty | H04B 7/063 |
| 2018/0302866 A1* | 10/2018 | Zhang | H04L 5/005 |
| 2019/0181994 A1* | 6/2019 | Chen | H04L 27/0014 |
| 2019/0207731 A1* | 7/2019 | Park | H04B 7/0628 |
| 2021/0105155 A1* | 4/2021 | Kons | H04L 25/0206 |

FOREIGN PATENT DOCUMENTS

| | | |
|---|---|---|
| CN | 108174439 | 6/2018 |
| TW | I565343 | 1/2017 |
| TW | 201815089 | 4/2018 |
| WO | 2017072745 | 5/2017 |
| WO | 2017139050 | 8/2017 |
| WO | 2017171305 | 10/2017 |

OTHER PUBLICATIONS

"Office Action of China Counterpart Application", dated Jan. 7, 2021, p. 1-p. 7.

\* cited by examiner

MULTI-CELL COORDINATION SYSTEM AND CHANNEL CALIBRATION METHOD THEREOF

BACKGROUND

Technical Field

The disclosure relates to a multi-cell coordination technology, and more particularly to a multi-cell coordination system and a channel calibration method thereof.

Description of Related Art

As compared to the traditional Fourth Generation (4D) Long Term Evolution (LTE) system, more antennas will be implemented in the Fifth Generation (5G) New Radio (NR) system to increase the transmission efficiency. Theoretically and practically, multi-antenna systems have been proved to be able to make use of technologies such as precoding and/or beamforming to allow multiple User Equipment (UE) to access wireless resources simultaneously, thereby enhancing the spectrum usage efficiency. In addition, researches in recent years have indicated that if the number of antennas carried by a base station is more than four times of the number of users, the spectral usage efficiency will be able to grow linearly as the number of users increases.

However, due to physical limitations, it is difficult for conventional base stations to be equipped with massive antennas. Therefore, relevant research has proposed that through coordinating multiple base stations to jointly perform data transmission to UE, the efficiency equivalent to that of massive antennas can be achieved. Such a structure is known as a Multi-Cell Coordination (MCC) system. In the MCC system, all base stations are controlled by a coordination server, and the coordination server can select the best transmission mode according to the user's condition. Since the clock source of each of the base stations in the MCC system is independent, Carrier Frequency Offset (CFO) between the base stations may exist, which is the largest difference as compared to a massive antenna system. In addition, other imperfect factors (for example, Sampling Clock Offset (SCO) generated due to CFO, timing offset caused by transmission delay, CFO causing downlink and uplink channels to have opposite linear phases, time-varying effect of Radio Frequency (RF) response, etc.) may also cause channel estimation to be inaccurate. Also, after precoding, Inter-Cell Interference (ICI) and Inter-User Interference (IUI) are more likely to be generated, thereby reducing the system capacity. This shows that the existing MCC systems still need to be improved.

SUMMARY

In view of the above, the disclosure provides a multi-cell coordination system and a channel calibration method thereof, which can solve the problems with the existing MCC systems and are applicable to multi-beam technology.

The multi-cell coordination system of the embodiments of the disclosure includes at least but not limited to a reference apparatus, a base station, and a server. The base station includes at least one antenna and the antennas provide a directional beam. The base station performs a first precoding on a downlink reference signal to be transmitted via the directional beam and the first precoding is based on a beam coding. The reference apparatus receives the downlink reference signal via the directional beam from the base station. The reference apparatus performs a second precoding on an uplink reference signal to be transmitted via the directional beam and the second precoding is based on the beam coding. The base station receives the uplink reference signal via the directional beam from the reference apparatus. A server receives an uplink channel information from the base station and a downlink channel information from the reference apparatus. The uplink channel information is generated based on the uplink reference signal and the second precoding, and the downlink channel information is generated based on the downlink reference signal and the first precoding. The server obtains a channel calibration coefficient according to the uplink channel information and the downlink channel information. The channel calibration coefficient is used for estimating a downlink channel.

On the other hand, the channel calibration method of the embodiments of the disclosure includes at least but not limited to the following steps. A first precoding is performed on a downlink reference signal to be transmitted via a directional beam through a base station, while the first precoding is based on a beam coding. The downlink reference signal via the directional beam from the base station is received through the reference apparatus. A second precoding is performed on an uplink reference signal to be transmitted via the directional beam through the reference apparatus, while the second precoding is based on the beam coding. The directional beam is provided through the base station to receive the uplink reference signal from the reference apparatus. An uplink channel information from the base station and a downlink channel information from the reference apparatus are received through a server. The uplink channel information is generated based on the uplink reference signal and the second precoding, and the downlink channel information is generated based on the downlink reference signal and the first precoding. A channel calibration coefficient is obtained according to the uplink channel information and the downlink channel information through the server, while the channel calibration coefficient is used for estimating a downlink channel.

Based on the above, the multi-cell coordination system and the channel calibration method thereof of the embodiments of the disclosure provide corresponding channel calibration coefficients for channels corresponding to different beams in response to the multi-beam technology in the future 5G NR system. In addition, problems with synchronization between base stations, time-varying effect of RF response, frequency selective fading channel, and obtaining downlink channel status information are solved through the reference apparatus, thereby achieving the performance of massive antenna system.

To make the aforementioned and other features of the disclosure more comprehensible, several embodiments accompanied with drawings are described in detail as follows.

DESCRIPTION OF THE EMBODIMENTS

Figure 1:
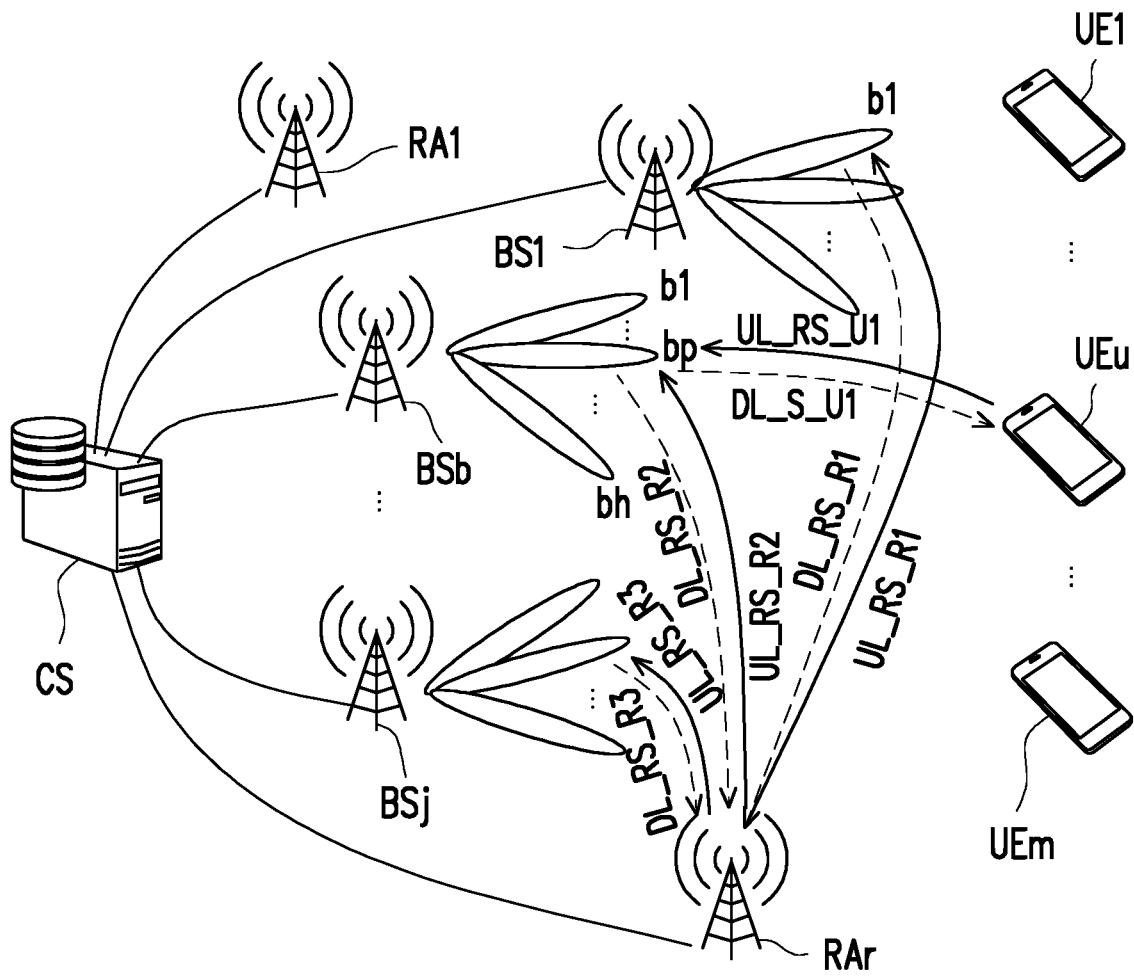
FIG. 1 is a schematic view of a multi-cell coordination system according to an embodiment of the disclosure.

FIG. 1 is a schematic view of a multi-cell coordination system 1 according to an embodiment of the disclosure. Referring to FIG. 1, the multi-cell coordination system 1 includes at least but not limited to one or more base stations BS1~BSj, one or more reference apparatuses RA1~RAr, a server CS, and one or more user equipment UE1~UEn. j, r, and n are positive integers.

The base station BS1~BSj may have various embodiments, such as (but not limited to) Home Evolved Node B (HeNB), eNB, Advanced Base Station (ABS), Base Transceiver System (BTS), relay, repeater, and/or satellite-based communication base station. In the embodiment, each of the base stations BS1~BSj has one or more antennas, and the antennas can provide multiple directional beams b1~bh, which are directed in a specific direction. For example, a base station BSb (b is a positive integer between 1 and j) transmits wireless signals using different directional beams b1~bh in sequence through a beam sweeping technique. h and j are positive integers.

The reference apparatuses RA1~RAr may have various embodiments, such as (but not limited to) mobile app, personal computer, or idle base station. The so-called idle base station refers to a base station judged by the server CS as not providing any service currently or with loading lower than a specific threshold value. The server CS may also schedule the base stations BS1~BSj and alternately use any idle one of the base stations BS1~BSj as the reference apparatuses RA1~RAr. In the embodiment, each of the reference apparatuses RA1~RAr has one or more antennas. r is a positive integer.

The server CS can be various types of server, computer host, workstation and other computation apparatuses. In the embodiment, the server CS connects the base stations BS1~BSj and the reference apparatuses RA1~RAr in wire or wireless manner.

The user equipment UE1~UEm may have various embodiments, such as (but not limited to) mobile station, Advanced Mobile Station (AMS), telephone apparatus, Customer Premise Equipment (CPE), wireless sensor, etc. The user equipment UE1~UEm can be served by any of the base stations BS1~BSj. m is a positive integer.

It shall be noted that the base stations BS1~BSj and the reference apparatuses RA1~RAr in the embodiment can make use of the Global Positioning System (GPS) signal to synchronize time. The base stations BS1~BSj, the reference apparatuses RA1~RAr, and the user equipment UE1~UEm have independent clock sources. In other words, each apparatus has its own carrier frequency. For example, the carrier frequency of the base station BSb is $\varepsilon_b$, while the carrier frequency of the reference apparatus RAr is $\eta_r$. In addition, the base stations BS1~BSj, the reference apparatuses RA1~RAr, and the user equipment UE1~UEm can support 4G, 5G, or future generations of mobile communication technologies. The disclosure is not limited thereto.

To facilitate understanding of the operation procedure of the embodiments of the disclosure, several embodiments are exemplified as below to illustrate in detail the operation procedure of the multi-cell coordination system 1 in the embodiments of the disclosure. Hereinafter, the method according to the embodiments of the disclosure will be illustrated in conjunction with the respective apparatuses in the multi-cell coordination system 1. Respective procedures of the method according to the embodiments of the disclosure can be adjusted according to the implementation condition and are not limited thereto. In addition, for ease of illustration, one or more apparatuses selected from the base stations BS1~BSj, the reference apparatuses RA1~RAr, and the user equipment UE1~UEm would be taken as examples for illustration. For the operation of the remaining apparatuses of the same type, refer to the corresponding illustration, which will not be reiterated.

Figure 2:
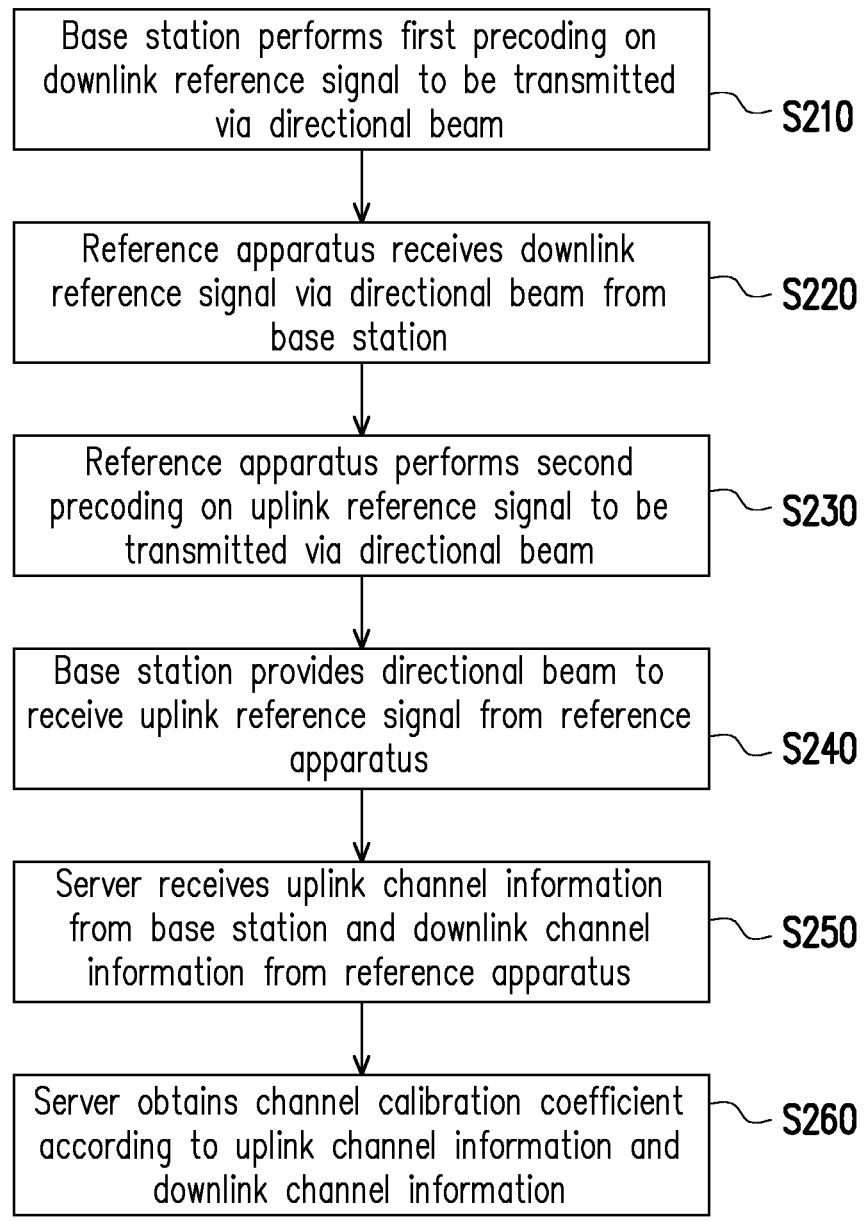
FIG. 2 is a flowchart of a channel calibration method according to an embodiment of the disclosure.

FIG. 2 is a flowchart of a channel calibration method according to an embodiment of the disclosure. Referring to FIG. 1 and FIG. 2, the base station BSb performs the first precoding on a downlink reference signal DL_RS_R2 to be transmitted via a directional beam bp (p is a positive integer between 1 and h) (Step S210). Specifically, the base station BSb can transmit different or the same downlink signals via multiple different directional beams b1~bh. For identification and/or enhancing transmission efficiency, the base station BSb will perform the first precoding on the downlink signals of all or some of the directional beams b1~bh based on a beam coding. The beam coding can be based on a beam codebook (for example, Precoding Matrix Indicators (PMI)) or other precoding matrixes. In other words, the downlink signal of each of the directional beams b1~bh is transmitted after precoding through the codewords, coefficients, or weights in the precoding matrixes. It shall be noted that the embodiment is exemplified using the directional beam bp, while the illustration of the remaining directional beams will not be reiterated The reference apparatus RAr receives the downlink reference signal DL_RS_R2 via the directional beam bp from the base station BSb (Step S220). Specifically, after the base station BSb transmits the downlink reference signal DL_RS_R2 at time t (using Time Division Duplexing (TDD) system as an example), the reference apparatus RAr may be assigned or voluntarily decide to receive signals via the directional beam bp.

Figure 3:
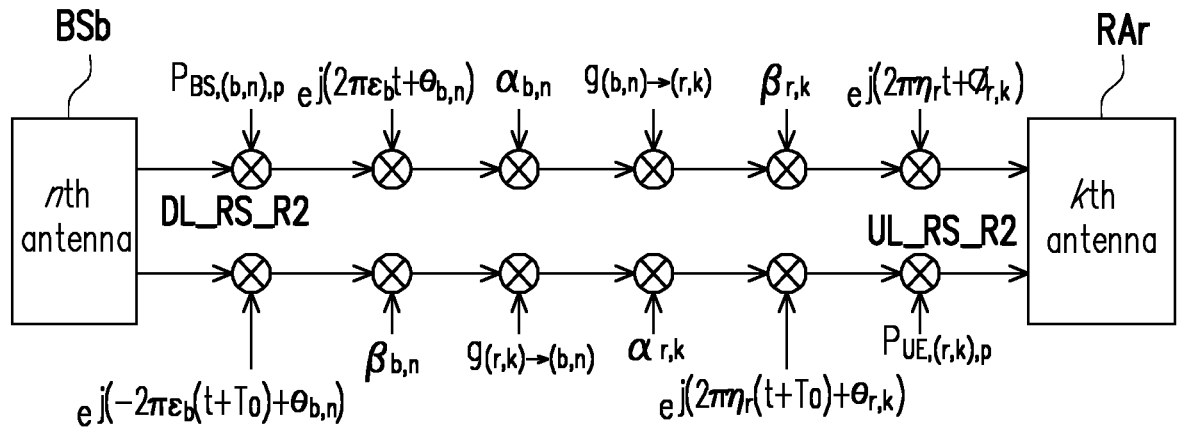
FIG. 3 is a transmission model between a base station and a reference apparatus according to an embodiment of the disclosure.

Referring to FIG. 3, which illustrates a transmission model between the base station BSb and the reference apparatus RAr according to an embodiment of the disclosure. Assuming that the nth antenna of the base station BSb provides the directional beam bp, while the kth antenna of the reference apparatus RAr receives a signal via the directional beam bp. The downlink reference signal DL_RS_R2 (from the base station BSb to the reference apparatus RAr, meaning via the downlink) is a training signal known by both the base station BSb and the reference apparatus RAr. The reference apparatus RAr can estimate the downlink channel information for the directional beam bp based on the downlink reference signal DL_RS_R2. The mathematical expression of the downlink channel is as below:

$$\tilde{h}_{(b,n)\to(r,k)}(t) = P_{BS,(b,n),p} \cdot \beta_{r,k} \cdot g_{(b,n)\to(r,k)} \cdot \alpha_{b,n} \cdot e^{j(2\pi(\varepsilon_{jb}+\varepsilon_b-\eta_r)t+\theta_{b,n}+\phi_{r,k})} \quad (1)$$

where $(b,n)\to(r,k)$ represents transmitting through the nth antenna of the bth base station (i.e. the base station BSb) and receiving through the kth antenna of the rth reference apparatus (i.e. the reference apparatus RAr); $P_{BS,(b,n),p}$ is the first precoding for the pth beam (i.e. the directional beam bp) by the base station BSb; $\beta_{r,k}$ is the RF response received at the kth antenna receiving end by the reference apparatus RAr; $\alpha_{b,n}$ is the RF response received at the nth antenna transmission end by the base station BSb; $g_{(b,n)\to(r,k)}$ is an Over-The-Air channel (if reciprocity is present, then $g_{(b,n)\to(r,k)}$ can also be considered as $g_{(r,k)\to(b,n)}$); $\theta_{b,n}$ is the initial phase at the nth antenna transmission end of the base station BSb; $\phi_{r,k}$ is the initial phase at the kth antenna receiving end of the reference apparatus RAr; $\varepsilon_b$ is the carrier frequency of the base station BSb; $\eta_r$ is the carrier frequency of the reference apparatus RAr; $\hat{\varepsilon}_{jb}$ is the estimated carrier frequency offset. Next, the reference apparatus RAr can transmit the downlink channel information estimated for the directional beam bp to the server SC.

Figure 4:
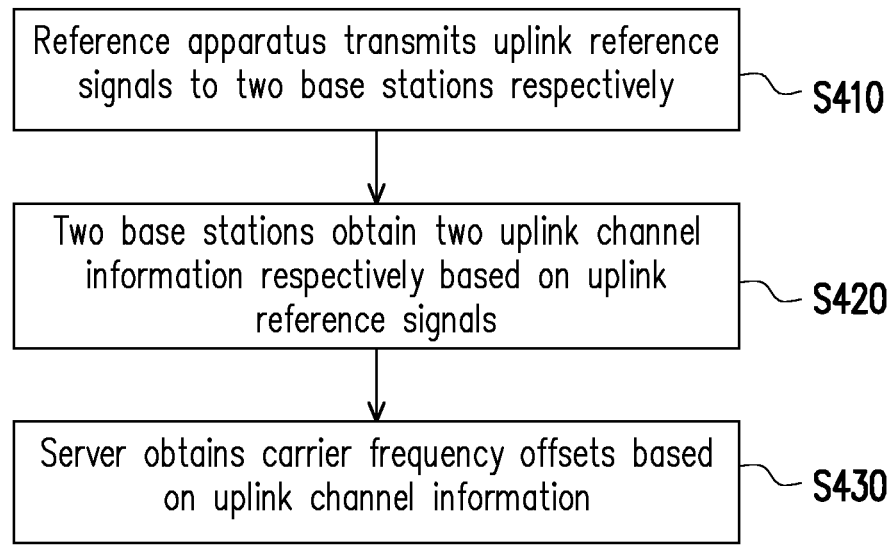
FIG. 4 is a flowchart of a carrier frequency offset estimation according to an embodiment of the disclosure.

It is worth noting that the carrier frequency offset $\hat{\varepsilon}_{jb}$ above can be estimated in advance or can be preset. The following explains how to estimate the carrier frequency offset $\hat{\varepsilon}_{jb}$. FIG. 4 is a flowchart of a carrier frequency offset estimation according to an embodiment of the disclosure. Referring to FIGS. 1 and 4, the base station BSb and the reference apparatus RAr are exemplified below for illustration. The reference apparatus RAr transmits uplink reference signals UL_RS_R2 and UL_RS_R3 to each of the base stations BSb and BSj (Step S410). The base stations BSb and BSj obtain two pieces of uplink channel information corresponding to each of the uplink reference signals UL_RS_R2 and UL_RS_R3 (Step S420). The server SC obtains the (relative) carrier frequency offsets of the two base stations BSb and BSj based on these uplink channel information (Step S430). In other words, the embodiments of the disclosure use the difference between the carrier frequency offsets of the two base stations BSb and BSj as the relative carrier frequency offset. As such, the base station BSb can obtain the uplink channel information as shown by Mathematical Expression (1) based on its own carrier frequency offset. It shall be noted that all of the base stations BS1~BSj can obtain the corresponding carrier frequency offset based on the embodiment of FIG. 4, which will not be reiterated. In addition, the reference apparatus RAr still needs to wait time D before transmitting the uplink reference signals UL_RS_R2 and UL_RS_R3, and the server SC will obtain the carrier frequency offset using the channel variance between the two timepoints.

Referring back to FIG. 2, the reference apparatus RAr performs a second precoding on the uplink reference signal UL_RS_R2 to be transmitted via the directional beam bp based on the beam coding (Step S230). In the embodiment, for the second precoding, refer to the illustration of the first precoding and adopt the same or different precoding matrix. Next, the reference apparatus RAr transmits the uplink reference signal UL_RS_R2 at time t+$T_0$ to allow the base station BSb to provide the directional beam bp to receive the uplink reference signal UL_RS_R2 from the reference apparatus RAr (Step S240). The uplink reference signal UL_RS_R2 (from the reference apparatus RAr to the base station BSb, meaning via the uplink) is a training signal known by both the base station BSb and the reference signal RAr. The base station BSb can estimate the uplink channel information for the directional beam bp based on the uplink reference signal UL_RS_R2. The mathematical expression of the uplink channel is as below:

$$\overline{h}_{(r,k)\to(b,n)}(t+T_0) = P_{RA,(r,k),p} \cdot \beta_{b,n} \cdot g_{(r,k)\to(b,n)} \cdot \alpha_{r,k} \cdot e^{j(-2\pi(\eta_r-\varepsilon_b+\varepsilon_{jb})(t+T_0)+\theta_{r,k}+\phi_{b,n})} \quad (2)$$

where $(r,k)\to(b,n)$ represents transmitting through the kth antenna of the reference apparatus RAr and receiving through the nth antenna of the base station BSb; $P_{RA,(r,k),p}$ is the second precoding for the directional beam bp by the reference apparatus RAr; $\beta_{b,n}$ is the RF response at the nth antenna receiving end of the base station BSb; $\alpha_{r,k}$ is the RF response at the kth antenna transmission end of the reference apparatus RAr; $g_{(r,k)\to(b,n)}$ is an Over-The-Air channel (if reciprocity is present, then $g_{(r,k)\to(b,n)}$ can also be seen as $g_{(b,n)\to(r,k)}$); $\phi_{b,n}$ is the initial phase at the nth antenna receiving end of the base station BSb; $\theta_{r,k}$ is the initial phase at the kth antenna transmission end of the reference apparatus RAr; $\varepsilon_b$ is the carrier frequency of the base station BSb; $\eta_r$ is the carrier frequency of the reference apparatus RAr; $\hat{\varepsilon}_{jb}$ is the estimated carrier frequency offset (which can be obtained by referring to the embodiment of FIG. 4). Next, the base station BSb can transmit the uplink channel information estimated for the directional beam bp to the server SC.

Referring back to FIG. 2, the server SC can then receive the uplink channel information (for example, Mathematical Expression (2)) from the base station BSb and the downlink channel information (for example, Mathematical Expression (1)) from the reference apparatus RAr (Step S250). The server SC obtains the channel calibration coefficient according to the uplink channel information and the downlink channel information (Step S260).

Specifically, the server SC uses the ratio of the uplink channel information to the downlink channel information corresponding to different timepoints as the calibration coefficient:

$$c_{(b,n)\to(r,k)}(t+T_0) = \frac{\overline{h}_{(b,n)\to(r,k)}(t)}{\overline{h}_{(r,k)\to(b,n)}(t+T_0)} = \frac{\frac{\alpha_{b,n} P_{BS,(b,n),p}}{\beta_{b,n}}}{\frac{\alpha_{r,k} P_{RA,(r,k),p}}{\beta_{r,k}}} e^{j(4\pi\hat{\varepsilon}_{1b}t+2\pi(\eta_r-\varepsilon_b+\varepsilon_{1b})T_0+\theta_{b,n}+\phi_{r,k}-\theta_{r,k}-\phi_{b,n})}, \quad (3)$$

wherein the time-varying phase of the channel calibration coefficient $c_{(b,n)\to(r,k)}(t+T_0)$ is caused by $e^{j(4\pi\hat{\varepsilon}_{1b}t)}$, and $\hat{\varepsilon}_{1b}$ is the estimated carrier frequency offset of the two base stations BSb and BS1.

Figure 5:
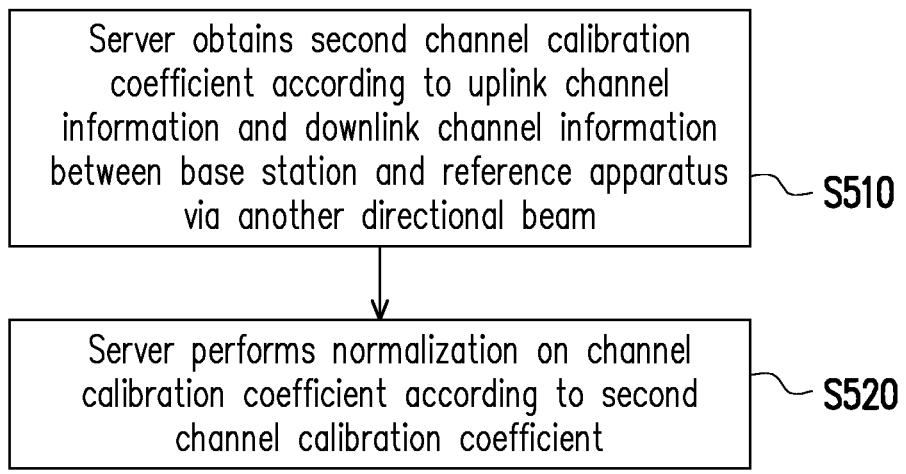
FIG. 5 is a flowchart of coefficient normalization according to an embodiment of the disclosure.

FIG. 5 is a flowchart of coefficient normalization according to an embodiment of the disclosure. Referring to FIG. 1 and FIG. 5, the server SC can obtain a second channel calibration coefficient according to the uplink channel information and the downlink channel information (assuming both through the first antenna) between a base station BS1 and the reference apparatus RAr via another directional beam b1 (Step S510). For the method of generating the second channel calibration coefficient, refer to the relevant illustration of FIG. 2 above. In other words, the reference apparatus RAr estimates the downlink channel information for the directional beam b1 based on the downlink reference signal RL_RS_R1 from the base station BS1. The base station BS1 estimates the uplink channel information for the directional beam b1 based on the uplink reference signal UL_RS_R1 from the reference apparatus RAr. The server SC then obtains the second channel calibration coefficient $c_{(1,1)\to(r,1)}(t+T_0)$ based on the up/downlink channel information for the directional beam b1. Next, the server SC performs normalization on the channel calibration coefficient obtained in Step S260 according to the second channel calibration coefficient (Step S520):

$$c'_{(b,n)\to(r,k)}(t+T_0) = \frac{c_{(b,n)\to(r,k)}(t+T_0)}{c_{(1,1)\to(r,1)}(t+T_0)} = \frac{\frac{\alpha_{b,n} P_{BS,(b,n),p}}{\beta_{b,n}} * \frac{\alpha_{r,1} P_{RA,(r,1),1}}{\beta_{r,1}}}{\frac{\alpha_{1,1} P_{BS,(1,1),1}}{\beta_{1,1}} * \frac{\alpha_{r,k} P_{RA,(r,k),p}}{\beta_{r,k}}} e^{j(4\pi\hat{\varepsilon}_{1b}t+2\pi(\varepsilon_1-\varepsilon_b+\varepsilon_{1b})T_0+\tilde{\theta}_{(b,n)\to(r,k)})} \quad (4)$$

where $c_{(1,1)\to(r,1)}(t+T_0)$ is the second channel calibration coefficient, $(1,1)\to(r,1)$ represents transmitting through the 1st antenna of the 1st base station (i.e. the base station BS1) and receiving through the 1st antenna of the reference apparatus RAr; $P_{BS,(1,1),1}$ is the first precoding for the 1st beam (i.e. the directional beam b1) by the base station BSb; $\beta_{r,1}$ is the RF response at the 1st antenna receiving end of the reference apparatus RAr; $\alpha_{1,1}$ is the RF response at the 1st antenna transmitting end of the base station BS1; $\tilde{\theta}_{(b,n)\to(r,k)}$ is the sum of the difference between the initial phase at the nth antenna transmitting end of the base station BSb and the initial phase at the 1st antenna transmitting end of the base station BS1, and the difference between the initial phase at the 1st antenna receiving end of the base station BS1 and the initial phase at the nth antenna receiving end of the base station BSb (i.e., $\tilde{\theta}_{(b,n)\to(r,k)} = \theta_{b,n} - \theta_{b=1,n=1} + \phi_{b=1,n=1} - \phi_{b,n}$); $\varepsilon_1$ is the carrier frequency of the base station BS1; $\varepsilon_{1b}$ is the estimated carrier frequency offset; $P_{RA,(r,1),1}$ is the second precoding for the directional beam b1 by the reference apparatus RAr; $\beta_{1,1}$ is the RF response at the 1st antenna receiving end of the base station BS1; $\alpha_{r,1}$ is the RF signal at the 1st antenna transmitting end of the reference apparatus RAr.

It shall be stated that the base station BS1, the 1st antenna, and the directional beam b1 are used here as the examples. However, in other embodiments, the server SC may also select any combination of other base station, other antenna, and/or other directional beam as the normalization benchmark. It shall be emphasized again that only the illustration for the nth antenna of the base station BSb, the directional beam bp, and the kth antenna of the reference apparatus RAr are stated above. For the channel calibration coefficient of any combination of other base station, other antenna, other directional beam, and other reference apparatus, refer to the illustration above, which will not be reiterated.

Figure 6:
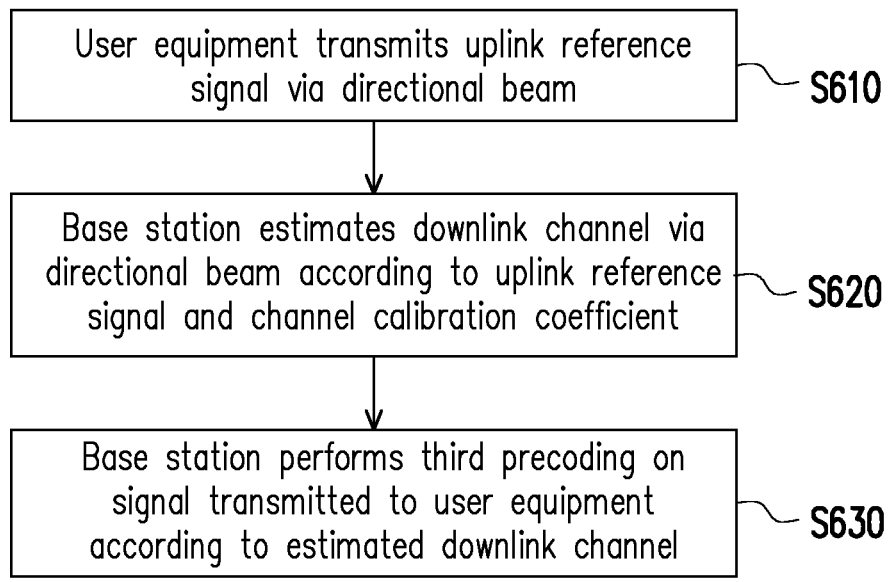
FIG. 6 is a flowchart of estimating an equivalent downlink channel according to an embodiment of the disclosure.

It is worth noting that the channel calibration coefficient above can be used for estimating the downlink channel between the base station BSb and the user equipment UE1~UEm, which will be illustrated below. FIG. 6 is a flowchart of estimating an equivalent downlink channel according to an embodiment of the disclosure. Referring to FIG. 1 and FIG. 6, at time t+T1, a user equipment UEu (u is a positive integer between 1 and m) transmits an uplink reference signal UL_RS_U1 via a directional beam bp1 to the base station BSb (Step S610). The base station BSb can estimate the (equivalent) downlink channel via the directional beam bp according to the uplink reference signal UL_RS_U1 and the (normalized) channel calibration coefficient $$c'_{(b,n)\to(r,k)}(t+T_0) \text{ (Step } S620\text{):} \quad (5)$$

$$\hat{h}_{(b,n)\to(u,1)}(t+T_1) = c'_{(b,n)\to(r,k)}(t+T_0)\bar{h}_{(u,1)\to(b,n)}(t+T_1) =$$
$$\hat{c}_{(b,n)\to(r,k)}(t+T_0) \cdot c^{-1}_{(b,n)\to(u,1)}(t+T_1) \cdot \bar{h}_{(b,n)\to(u,1)}(t+T_1) =$$
$$\frac{\bar{h}_{(u,1)\to(b,n)}(t+T_1)}{\hat{c}_{(r,k)\to(u,1)}(t+T_1)} e^{j(-2\pi(\varepsilon_b-\eta_u)T_1)}$$

where $\eta_u$ is the carrier frequency of the uth user equipment (i.e. the user equipment UEu) and $\hat{c}_{(b,n)\to(r,k)}(t+T_0)$ is the channel calibration coefficient calculated using the reference apparatuses RA1~RAr and the base stations BS1~BSj. In other words, the server CS makes use of the channel calibration coefficient calculated by the reference apparatuses RA1~RAr and the base stations BS1~BSj to calculate the downlink channel information of the user equipment UEu.

In addition, the downlink channel matrix for the directional beam bp can be expressed as:

$$\hat{H}(t+T_1) = \begin{bmatrix} c^{-1}_{(r,k)\to(u,1)}(t+T_1) & & \\ & \ddots & \\ & & c^{-1}_{(r,k)\to(m,1)}(t+T_1) \end{bmatrix} \cdot \quad (6)$$

$$\begin{bmatrix} e^{-j2\pi(\varepsilon_1-\eta_1)T_1} h_{BS1\to UE1}(t+T_1) & \cdots & e^{-j2\pi(\varepsilon_{N_b}-\eta_1)T_1} h_{BSj\to UE1}(t+T_1) \\ \vdots & \ddots & \vdots \\ e^{-j2\pi(\varepsilon_1-\eta_{N_u})T_1} h_{BS1\to UEm}(t+T_1) & \cdots & e^{-j2\pi(\varepsilon_{N_b}-\eta_{N_u})T_1} h_{BSj\to UEm}(t+T_1) \end{bmatrix} =$$

$$C^{-1}_{(r,k)}(t+T_1)H^{CFO}(t+T_1)$$

where $h_{BS1\to UE1}$ represents the channel vector from the base station BS1 to the user equipment UE1 (so on and so forth), $C_{(r,k)}^{-1}(t+T_1)$ is the matrix of the channel calibration coefficient, and $H^{CFO}(t+T_1)$ is the matrix of the carrier frequency offset.

Next, the base station BSb can perform a third precoding on the signal transmitted to the user equipment UEu according to the estimated downlink channel (Step S630). The third precoding is based on, for example, Zero forcing, Minimum Mean-Square Error (MMSE), or other equalization algorithms. At time t+T2, the base station BSb can serve the user equipment UEu using the downlink signal generated by the third precoding above. It shall be stated that the transmission behavior between the base station BSb and the user equipment UEu is used here as the illustration example. For the transmission behavior between any combination of other base station and other user equipment, refer to the illustration above, which will not be reiterated.

Based on the above, the multi-cell coordination system and the channel calibration method thereof of the embodiments of the disclosure make use of a reference apparatus to solve the problems with synchronization between base stations, time-varying effect of RF response, frequency selective fading channel, and obtaining downlink channel status information. In addition, the embodiments of the disclosure further consider the implementation in multi-beam transmission, so as to be applied to 5G or future generations of communication systems.

Although the disclosure has been disclosed in the above embodiments, the embodiments are not intended to limit the disclosure. It will be apparent to persons skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A multi-cell coordination system, comprising:
a base station, comprising at least one antenna, wherein the at least one antenna provides a plurality of beams, each of the plurality of beams is configured with a direction, and the base station performs a first precoding on a downlink reference signal to be transmitted via a selected beam of the plurality of beams, wherein the first precoding is based on a beam coding;
a reference apparatus, wherein the reference apparatus receives the downlink reference signal via the selected beam from the base station, and the reference apparatus performs a second precoding on an uplink reference signal to be transmitted via the selected beam, wherein the second precoding is based on the beam coding, and the base station receives the uplink reference signal via the selected beam from the reference apparatus;
a server, used for receiving an uplink channel information from the base station and a downlink channel information from the reference apparatus, wherein the uplink channel information is generated based on the uplink reference signal and the second precoding, and the downlink channel information is generated based on the downlink channel information and the first precoding, and the server obtains a channel calibration coefficient according to the uplink channel information and the downlink channel information, wherein the channel calibration coefficient is used for estimating a downlink channel; and
a second base station, wherein the server obtains a second channel calibration coefficient according to a second uplink channel information and a second downlink channel information between the second base station and the reference apparatus via a second selected beam of the plurality of beams different from the selected beam, the server performs normalization on the channel calibration coefficient according to the second channel calibration coefficient, and the base station estimates the downlink channel via the selected beam according to a normalized channel calibration coefficient.

2. The multi-cell coordination system according to claim 1, further comprising:
a user equipment, used for transmitting a second uplink reference signal via the selected beam, the base station estimating the downlink channel via the selected beam according to the second uplink reference signal and the normalized channel calibration coefficient, and the base station performing a third precoding on a signal transmitted to the user equipment according to the estimated downlink channel.

3. The multi-cell coordination system according to claim 1, further comprising:
a third base station, wherein the reference apparatus transmits a third uplink reference signal to each of the base station and the third base station, the base station and the third base station obtain two pieces of third uplink channel information respectively based on the third uplink reference signal, and the server obtains a carrier frequency offset based on the two pieces of the third uplink channel information, wherein the base station obtains the uplink channel information based on the carrier frequency offset and the uplink reference signal, and the reference apparatus obtains the downlink channel information based on the carrier frequency offset and the downlink reference signal.

4. The multi-cell coordination system according to claim 1, wherein the downlink channel information and the uplink channel information are further related to initial phases of the transmitting end and the receiving end, carrier frequency offsets, and carrier frequencies of the base station and the reference apparatus.

5. A channel calibration method, comprising:
performing, through a base station, a first precoding on a downlink reference signal to be transmitted via a selected beam of a plurality of beams, wherein each of the plurality of beams is configured with a direction, and the first precoding is based on a beam coding;
receiving, through a reference apparatus, the downlink reference signal via the selected beam from the base station;
performing, through the reference apparatus, a second precoding on an uplink reference signal to be transmitted via the selected beam, wherein the second precoding is based on the beam coding;
providing, through the base station, the selected beam to receive the uplink reference signal from the reference apparatus;
receiving, through a server, an uplink channel information from the base station and a downlink channel information from the reference apparatus, wherein the uplink channel information is generated based on the uplink reference signal and the second precoding, and the downlink channel information is generated based on the downlink channel information and the first precoding;
obtaining, through the server, a channel calibration coefficient according to the uplink channel information and the downlink channel information, wherein the channel calibration coefficient is used for estimating a downlink channel;
obtaining, through the server, a second channel calibration coefficient according to a second uplink channel information and a second downlink channel information between a second base station and the reference apparatus via a second selected beam of the plurality of beams different from the selected beam;
performing, through the server, normalization on the channel calibration coefficient according to the second channel calibration coefficient; and
estimating, through the base station, the downlink channel via the selected beam according to the second uplink reference signal and a normalized channel calibration coefficient.

6. The channel calibration method according to claim 5, wherein after a step of obtaining the channel calibration coefficient, further comprising:
transmitting, through a user equipment, a second uplink reference signal via the selected beam;
estimating, through the base station, the downlink channel via the selected beam according to the second uplink reference signal and the normalized channel calibration coefficient; and
performing, through the base station, a third precoding on a signal transmitted to the user equipment according to the estimated downlink channel.

7. The channel calibration method according to claim 5, wherein before a step of receiving the downlink reference signal from the base station, further comprising:

transmitting, through the reference apparatus, a third uplink reference signal to each of the base station and a third base station;

obtaining, through each of the base station and the third base station, two pieces of third uplink channel information based on the third uplink reference signal; and obtaining, through the server, a carrier frequency offset based on the two pieces of third uplink channel information, wherein the uplink channel information is obtained based on the carrier frequency offset and the uplink reference signal, and the downlink channel information is obtained based on the carrier frequency offset and the downlink reference signal.

8. The channel calibration method according to claim 5, wherein the downlink channel information and the uplink channel information are further related to initial phases of the transmitting end and the receiving end, carrier frequency offsets, and carrier frequencies of the base station and the reference apparatus.

* * * * *